(12) United States Patent
Kato et al.

(10) Patent No.: US 7,896,145 B2
(45) Date of Patent: Mar. 1, 2011

(54) AUTOMATIC TRANSMISSION INCLUDING CLUTCH DEVICES

(75) Inventors: Naoki Kato, Aichi-gun (JP); Terufumi Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 627 days.

(21) Appl. No.: 11/915,600

(22) PCT Filed: Jun. 1, 2006

(86) PCT No.: PCT/JP2006/311462
§ 371 (c)(1),
(2), (4) Date: Nov. 27, 2007

(87) PCT Pub. No.: WO2006/132291
PCT Pub. Date: Dec. 14, 2006

(65) Prior Publication Data
US 2009/0114500 A1 May 7, 2009

(30) Foreign Application Priority Data
Jun. 7, 2005 (JP) .............................. 2005-167358

(51) Int. Cl.
*F16D 25/10* (2006.01)
(52) U.S. Cl. .................... 192/48.619; 475/146
(58) Field of Classification Search ............ 192/48.609, 192/48.611, 48.618, 48.61, 48.619; 475/146
See application file for complete search history.

(56) References Cited

U.S. PATENT DOCUMENTS

| 4,747,323 A | 5/1988 | Kiuchi et al. |
| 6,499,578 B1 * | 12/2002 | Kundermann et al. .. 192/48.618 |
| 2005/0205378 A1 | 9/2005 | Miyazaki et al. |
| 2009/0020386 A1 * | 1/2009 | Kato et al. .................. 192/48.1 |

FOREIGN PATENT DOCUMENTS

| DE | 101 33 638 A1 | 1/2003 |
| DE | 603 02 573 T2 | 7/2006 |
| EP | 0 288 950 | 11/1988 |
| JP | 60-104839 | 6/1985 |
| JP | 60-104840 | 6/1985 |
| JP | 60-109618 | 6/1985 |
| JP | 63-270967 | 11/1988 |

(Continued)

*Primary Examiner*—Rodney H Bonck
(74) *Attorney, Agent, or Firm*—Oblon, Spivak, McClelland, Maier & Neustadt, L.L.P.

(57) ABSTRACT

An automatic transmission including a first clutch, a second clutch, a first drum in which a first piston of the first clutch is axially slidably received and that cooperates with the first piston to define a first oil chamber, a second drum disposed coaxially with the first drum, so as to accommodate the first drum, and in which a second piston of the second clutch is axially slidably received, the second drum cooperating with the second piston to define a second oil chamber, a first fluid supply portion for feeding a working fluid into the first oil chamber through the first drum and the second drum, to operate the first piston, and a second fluid supply portion for feeding the working fluid into the second oil chamber through the second drum, to operate the second piston, and wherein the second fluid supply portion is located radially outwardly of the first fluid supply portion.

14 Claims, 2 Drawing Sheets

FOREIGN PATENT DOCUMENTS

| | | |
|---|---|---|
| JP | 63-297848 | 12/1988 |
| JP | 2-203049 | 8/1990 |
| JP | 2-225881 | 9/1990 |
| JP | 4-50515 | 2/1992 |
| JP | 5-33833 | 2/1993 |

* cited by examiner

|  | C1 | C2 | C3 | C4 | B1 | B2 | F1 |
|---|---|---|---|---|---|---|---|
| P- |  |  |  |  |  |  |  |
| Rev1 |  | ○ |  |  |  | ○ |  |
| Rev2 | ○ |  |  |  |  | ○ |  |
| N |  |  |  |  |  |  |  |
| 1st |  |  | ○ |  |  | (○) | ○ |
| 2nd |  |  | ○ |  | ○ |  |  |
| 3rd |  | ○ | ○ |  |  |  |  |
| 4th | ○ |  | ○ |  |  |  |  |
| 5th |  |  | ○ | ○ |  |  |  |
| 6th | ○ |  |  | ○ |  |  |  |
| 7th |  | ○ |  | ○ |  |  |  |
| 8th |  |  |  | ○ | ○ |  |  |

○ ENGAGED STATE

AUTOMATIC TRANSMISSION INCLUDING CLUTCH DEVICES

TECHNICAL FIELD

The present invention relates in general to an automatic transmission including clutch devices, and more particularly to an automatic transmission having a compact arrangement of the clutch devices and a reduced axial dimension.

BACKGROUND ART

There is known an automatic transmission of a type incorporating a plurality of frictional coupling devices including a plurality of clutches which have respective clutch drums for operating the clutches. For reducing the required axial dimension of the automatic transmission, one of the clutch drums is disposed within another of the clutch drums. JP-5-33833 A discloses an example of such type of automatic transmission which incorporates two clutches operable to connect one rotary member to respective two other rotary members, and in which the clutch drum of one of those two clutches is fitted in the clutch drum of the other clutch, whereby the required axial dimension of the automatic transmission can be reduced.

In the automatic transmission disclosed in the above-identification publication, two fluid passages through which a working fluid is supplied to advance pistons of the two clutches to force friction plates against each other are formed in the axial direction of the automatic transmission, at substantially the same radial position. Although the required axial dimension of the automatic transmission can be reduced owing to the arrangement in which one of the two clutch drums is disposed radially inwardly within the other clutch drum, the arrangement of the two fluid passages described above undesirably results in an increase of the required axial dimension of the automatic transmission, so that the automatic transmission has a comparatively large axial overall length.

DISCLOSURE OF THE INVENTION

The present invention was made in view of the background art described above. It is an object of this invention to provide an automatic transmission which includes a plurality of frictional coupling devices and which has a reduced axial dimension.

The object indicated above may be achieved according to the principle of the present invention, which provides an automatic transmission including a first clutch and a second clutch, comprising (a) a first drum in which a first piston of the first clutch is axially slidably received and which cooperates with the first piston to define a first oil chamber therebetween, (b) a second drum which is disposed coaxially with the first drum, so as to accommodate the first drum, and in which a second piston of the second clutch is axially slidably received, the second drum cooperating with the second piston to define a second oil chamber therebetween, (c) a first fluid supply portion for feeding a working fluid into the first oil chamber through the first drum and the second drum, to operate the first piston, and (d) a second fluid supply portion for feeding the working fluid into the second oil chamber through the second drum, to operate the second piston, and wherein the second fluid supply portion is located radially outwardly of the first fluid supply portion.

In the automatic transmission constructed according to the present invention as described above the second fluid supply portion is located radially outwardly of the first fluid supply portion, so that the first and second fluid supply portions do not interfere with each other in the axial direction of the automatic transmission. Accordingly, the first and second fluid supply portions 82, 92 can be located close to each other in the axial direction of the automatic transmission, whereby the required axial dimension of the automatic transmission can be reduced. Where the automatic transmission is installed on a front-drive vehicle of the type in which the axis of the automatic transmission extends in the transverse or lateral direction of the vehicle, in particular, the overall width of the vehicle can be reduced.

In one preferred form of the present invention, the second drum includes a second inner cylindrical wall and a second outer cylindrical wall which are coaxial with each other, and further includes a second bottom wall connecting the corresponding axial end portions of the second inner and outer cylindrical walls, and a second annular protrusion extending from a radially intermediate part of the second bottom wall in an axial direction thereof toward the first drum. In this form of the invention, the second inner cylindrical wall and the second annular protrusion of the second drum are rotatably supported by a housing of the automatic transmission, and the second piston is axially received in a second annular recess formed between the second annular protrusion and the second outer cylindrical wall. Further, the second oil chamber is defined by the second piston, the second outer cylindrical wall, the second bottom wall and the second annular protrusion, and the second fluid supply portion communicates with the second oil chamber through a second through-hole formed through the second annular protrusion. Accordingly, the pressurized working fluid is fed into the second oil chamber through the second through-hole formed through the second annular protrusion, so that the second piston axially slidably received in the second oil chamber is axially moved by the pressure of the working fluid introduced into the second oil chamber.

In one advantageous arrangement of the preferred form of the invention described above, the first drum includes a first inner cylindrical wall and a first outer cylindrical wall which are coaxial with each other, and further includes a first bottom wall connecting corresponding axial end portions of the first inner and outer cylindrical walls, and a first annular protrusion extending from a radially intermediate part of the first bottom wall in an axial direction thereof away from the second drum. In this case, the first piston is axially slidably received in a first annular recess formed between the first annular protrusion and the first outer cylindrical wall, and the first oil chamber is defined by the first piston, the first inner cylindrical wall, the first bottom wall and first annular protrusion. Further, the first fluid supply portion communicates with the first oil chamber through a first through-hole formed through the first inner cylindrical portion, and a third through-hole formed through the second inner cylindrical wall. Accordingly, the pressurized working fluid is fed into the first oil chamber through the first fluid supply portion, the first through-holes formed through the first inner cylindrical wall of the first drum, and the third through-hole formed through the second inner cylindrical wall of the second drum, so that the first piston axially slidably received in the first oil chamber is axially moved by the pressure of the working fluid introduced into the first oil chamber.

The first inner cylindrical wall of the first drum and the second inner cylindrical wall of the second drum may be fixed to each other so as to inhibit relative rotation of the first and second inner cylindrical walls, so that the first and third through-holes can be formed through the respective first and second inner cylindrical walls.

The first clutch may be provided to selectively connect a first rotary member to a second rotary member disposed coaxially with the first rotary member while the second clutch may be provided to selectively connect the first rotary member to a third rotary member disposed coaxially with said first rotary member. In this case, the first rotary member can be rotated at different speeds when the first clutch and the second clutch are selectively engaged, respectively, permitting the automatic transmission to have a relatively large number of operating positions having respective different speed ratios.

BEST MODE FOR CARRYING OUT THE INVENTION

Figures 1, 2:
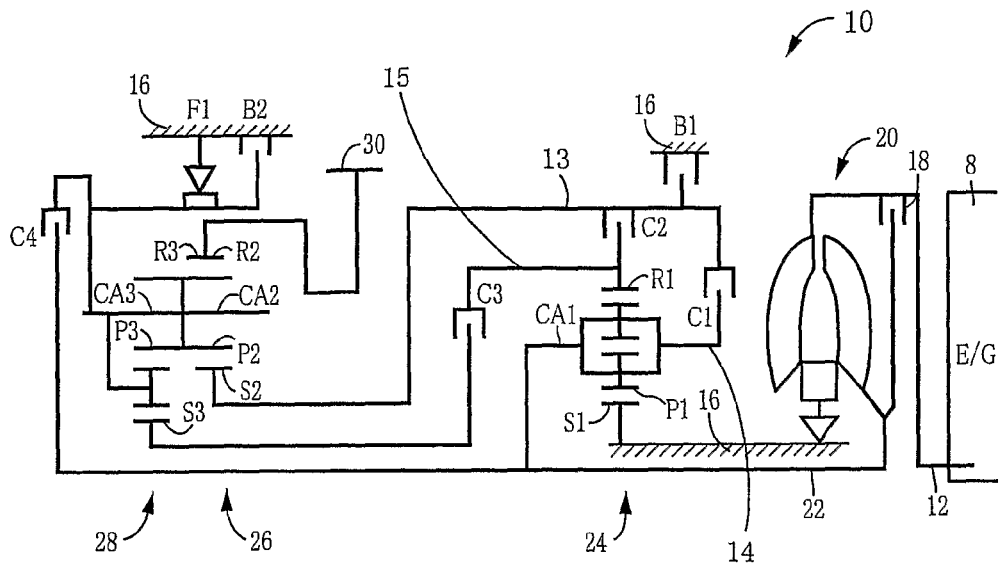
FIG. 1 is a schematic view of an automatic transmission constructed according to one embodiment of the present invention is applicable.
FIG. 2 is a view indicating combinations of frictional coupling clutches placed in their engaged states to establish respective operating positions (gear positions) of the automatic transmission of FIG. 1.

Referring first to the schematic view of FIG. 1, there is shown an automatic transmission 10 of a vehicle constructed according to one embodiment of this invention. The automatic transmission 10 is disposed between an engine 8, and drive wheels (not shown) of the vehicle, and is constructed to transmit an output of the engine 8 to the drive wheels. The vehicle has a body to which a stationary member in the form of housing 16 is fixed. Within this housing 16, there are accommodated a torque converter 20, an input shaft 22 connected to the torque converter 20, a first planetary gear set 24, a second planetary gear set 26, and a third planetary gear set 28, such that these major components 20, 22, 24, 26, 28 are arranged in the order of description in the left direction as seen in FIG. 1. The torque converter 20 is provided with a lock-up clutch 18 arranged to transmit a rotary motion of a crankshaft 12 of the engine 8 through a power transmitting medium in the form of a fluid. The automatic transmission 10 has an output shaft 30 a rotary motion of which is transmitted to the drive wheels through a counter gear (not shown). Since the automatic transmission 10 is constructed symmetrically with respect to its axis, a lower half of the automatic transmission 10 is not shown in the schematic view of FIG. 1.

The first planetary gear set 24 is of a double-pinion type including a sun gear S1, a plurality of pairs of mutually meshing planetary gears P1, a carrier CA1 supporting the planetary gears P1, and a ring gear R1 meshing with the sun gear S1 through the planetary gears P1. The carrier CA1 supports the planetary gears P1 such that each planetary gear P1 is rotatable about its axis and such that the planetary gears P1 are rotatable about an axis of the automatic transmission 10.

A first clutch C1 is disposed between the carrier CA1 of the first planetary gear set 24 and the torque converter 20, and a first brake B1 is disposed radially outwardly of the first clutch C1. Further, a second clutch C2 is disposed radially outwardly of the ring gear R1, and a third clutch C3 is disposed between the carrier CA1 and the second planetary gear set 26.

Each of the second and third planetary gear sets 26, 28 is of a Ravingneaux type wherein the carrier and the ring gear are formed integrally with each other. The second planetary gear set 24 is of a single-pinion type including a sun gear S2, a planetary gear P2, a carrier CA2 and a ring gear R2 meshing with the sun gear S2 through the pinion gear P2. The carrier CA2 supports the pinion gear P2 such that the pinion gear P2 is rotatable about its axis and about the axis of the automatic transmission 10. The third planetary gear set 28 is of a double-pinion type including a sun gear S3, a plurality of pairs of mutually meshing pinion gears P3, a carrier CA3, and a ring gear R3 meshing with the sun gear S3 through the pinion gears P3. The carrier CA3 supports the pinion gears P3 such that each pinion gear P3 is rotatable about its axis and such that the pinion gears P3 are rotatable about the axis of the automatic transmission 10.

A second brake B2 and a one-way clutch F1 are disposed radially outwardly of the ring gear R2 of the second planetary gear set 26, and a fourth clutch C4 is disposed radially outwardly of the third planetary gear set 28.

In the first planetary gear set 24, the sun gear S1 is fixed to the housing 16, and is held stationary, and the carrier CA1 is fixed directly to the input shaft 22. Since the carrier CA1 is fixed to a second rotary member 14 as well as the input shaft 22, the carrier CA1 is considered to function as the second rotary member 14. The ring gear R1 is always rotated at a fixed speed ratio. Since the ring gear R1 is fixed to a third rotary member 15, the ring gear R1 is considered to function as the third rotary member 15. The second rotary member 14 (carrier CA1) is connectable through the first clutch C1 to a first rotary member 13 fixed to the second sun gear S1 of the second planetary gear set 26, so that a rotary motion of the input shaft 22 is transmitted to the second sun gear S2 without speed reduction while the first clutch C1 is placed in its engaged state. The third rotary member 15 (ring gear R1) is connectable through the second clutch C2 to the first rotary member 13, and connectable through the third clutch C3 to the sun gear S3 of the third planetary gear set 28, so that a rotary motion of the ring gear R1 rotating at the fixed speed ratio is transmitted to the sun gear S2 while the second clutch C2 is placed in its engaged state, and to the sun gear S3 while the third clutch C3 is placed in its engaged state. The first rotary member 13 can be fixed to the housing 16 and held stationary while the first brake B1 is placed in its engaged state.

In the second planetary gear set 26, the sun gear S2 is fixed to the first planetary gear set 24, as described above, and the carrier CA2 is formed integrally with the carrier CA3 of the third planetary gear set 28. The sun gear S2 is connectable through the fourth clutch C4 to the input shaft 22, and can be fixed to the housing 16 through the second brake B2 or one-way clutch F1. The ring gear R2 is formed integrally with the ring gear R2 of the third planetary gear set 28, and is fixed to the output shaft 30. A rotary motion of the output shaft 30 is transmitted to the drive wheels through the counter gear described above.

In the third planetary gear set 28, the sun gear S3 is connectable through the third clutch C3 to the ring gear R1 of the first planetary gear set 24, as described above. The carrier CA3 has the same function as the carrier CA2, and the ring gear R3 operates in the same manner as the ring gear R2.

The automatic transmission 10 constructed as described above is placed in a selected one of its operating positions "Rev1", "Rev2", "N", "$1^{st}$", "$2^{nd}$", "$3^{rd}$", "$4^{th}$", "$5^{th}$", "$6^{th}$", "$7^{th}$" and "$8^{th}$", when the corresponding one of eleven combinations of two frictional coupling devices selected from the clutches C1-C4, brakes B1, B2 and one-way clutch F1 is placed in the engaged state, as indicated in FIG. 2. In this figure, "O" represents the engaged state of each frictional coupling device.

Figure 3:
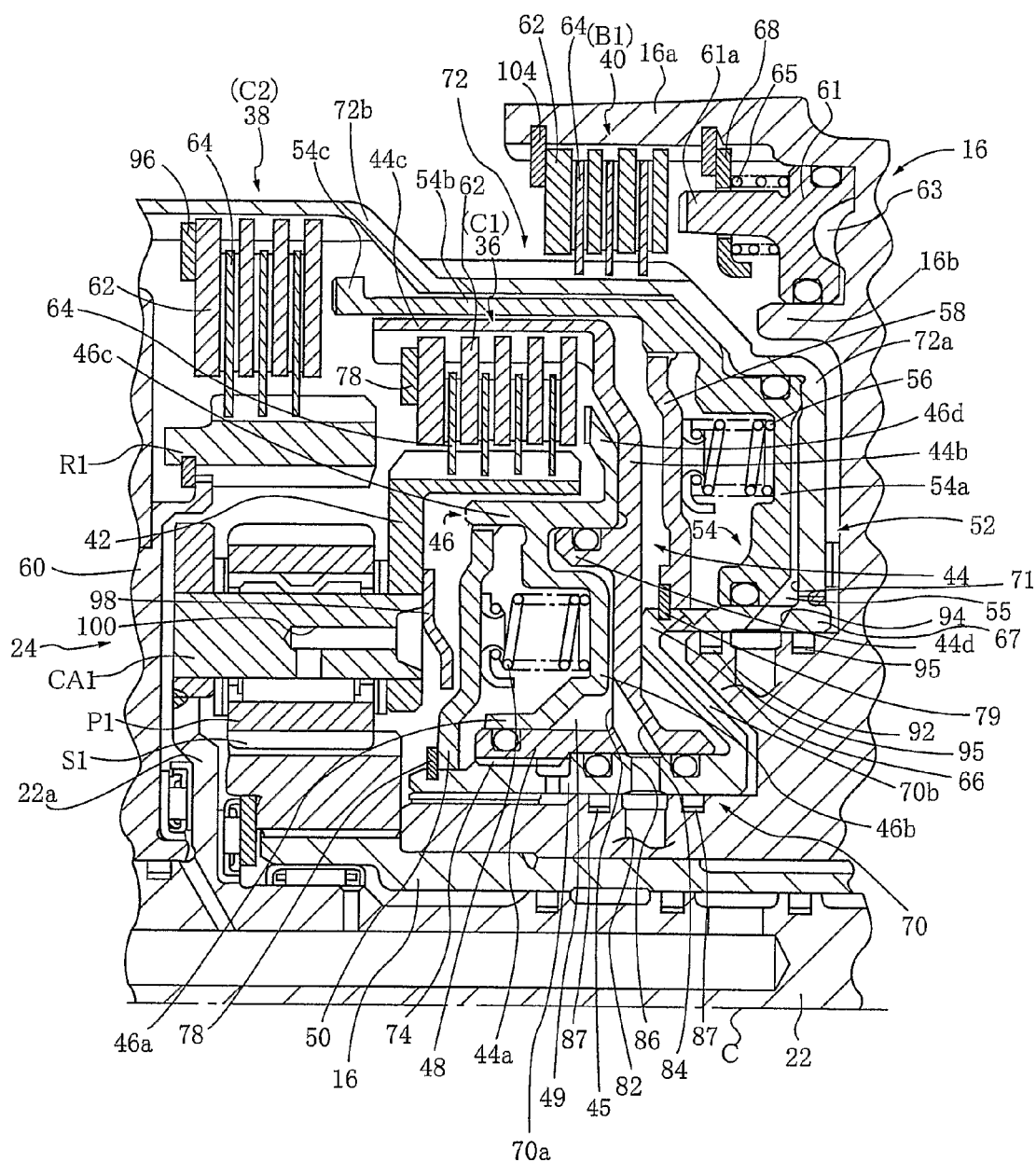
FIG. 3 is a fragmentary elevational view in cross section of clutches devices incorporated in the automatic transmission of FIG. 1.

The automatic transmission 10 is also shown in the fragmentary elevational view in cross section of FIG. 3, wherein "C" represents the axis of the automatic transmission 10, the lower half of which is not shown.

In FIG. 3, the clutch C1 is shown as a first frictional coupling device 36, and the clutch C2 is shown as a second frictional coupling device 38, while the brake B1 is shown as a third frictional coupling device 40.

In the first planetary gear set 24 shown in detail in FIG. 3, the carrier CA1 is fixed to a flange portion 22a of the input shaft 22 which is rotatably supported by bearings including thrust bearings. The flange 22a extends radially outwardly from the input shaft 22, that is, perpendicularly to the axis C. The un gear S1 is fixed to the housing 16, and the ring gear R1 in the form of an annular member meshing with the planetary gears P1 has a splined outer circumferential surface to which are splined a plurality of friction plates 64 of the second frictional coupling device 38. The ring gear R1 is fixed to the second clutch hub 60, so that a rotary motion of the ring gear R1 is transmitted to the second clutch hub 60.

The first frictional coupling device 36 in the form of the first clutch C1 includes, as its major components, a first clutch hub 42, a first drum 44, a first piston 46 axially slidably received within the first drum 44, a return spring 48, and a spring seat 50 on which the return spring 48 is seated. The first clutch hub 42 receives a rotary motion of the input shaft 22 through the carrier CA1 of the first planetary gear set 24. The return spring 48 biases the first piston 46 toward its original axial position in an axial direction away from friction plates 62, 64 of the first frictional coupling device 36.

The second frictional coupling device 38 in the form of the second clutch C2 includes, as its major components, a second clutch hub 60 formed integrally and rotatable with the ring gear R1 of the first planetary gear set 24, a second drum 52, a second piston 54 axially slidably received within the second drum 52, a return spring 56, and a spring seat 58 on which the return spring 56 is seated. The return spring 56 biases the second piston 54 toward its original axial position in the axial direction away from the friction plates 62, 64 of the second frictional coupling devices 38.

The third frictional coupling device 40 in the form of the first brake B1 includes, as its major components, the above-described second drum 52, a third piston 61, a return spring 65, a spring seat 68 on which the return spring 65 is seated, and the housing 16. The second drum 52 has a splined outer circumferential surface to which are splined the friction planes 64 of the third frictional coupling device 40.

The first drum 44 is a double-sleeve structure which is open at one of its opposite axial ends and is closed at the other axial end. Described in detail, the first drum 44 consists of: a first inner cylindrical wall 44a and a first outer cylindrical wall 44c having a common axis aligned with the axis C; a first bottom wall 44b in the form of an annular disc connecting the first inner and outer cylindrical walls 44a, 44c at their corresponding axial ends; and a first annular protrusion 44d protruding from a radially intermediate part of the first bottom wall 44b in the axial direction toward the open end of the first drum 44, namely, in the axial direction away from the second drum 52.

The first inner cylindrical wall 44a has an inner circumferential surface having a diameter substantially equal to a diameter of an outer circumferential surface of a second inner cylindrical wall 70a (described below) of the second drum 52, so that the first inner cylindrical wall 44a is fitted on the second inner cylindrical wall 70a. The first outer cylindrical wall 44a has a splined outer circumferential surface to which the friction plates 62 of the first frictional coupling device 36 are splined at their radially outer ends. The friction plates 62 and the friction plates 64 are alternately arranged in the axial direction of the first frictional coupling device 36 such that each of the friction plates 64 is sandwiched between the adjacent two friction plates 62. The friction plates 64 are splined at their radially inner ends to a splined outer circumferential surface of the first clutch hub 42. This first clutch hub 42 is fixed to the carrier CA1 of the first planetary gear set 24, and is rotated with the carrier CA1. The first clutch hub 42 as well as the carrier CA1 functions as the second rotary member 14 shown in FIG. 1.

The first piston 46 is axially slidably fitted in a first annular recess 45 formed between the first annular protrusion 44d and the first inner cylindrical wall 44a of the first drum 44.

The first piston 46 includes a first inner sleeve portion 46a axially slidably fitted on an outer circumferential surface of the first inner cylindrical wall 44a of the first drum 44 through an O-ring, a first outer sleeve portion 46c axially sidably fitted on an outer circumferential surface of the first annular protrusion 44d of the first drum 44 through an O-ring, a base portion 46b in the form of an annular disc connecting the first inner and outer sleeve portions 46a, 46c, and a presser portion 46d which extends radially outwardly from one axial end of the first outer sleeve portion 46c which is adjacent to the first annular protrusion 44d of the first drum 44. The presser portion 46d has a distal end portion for pressing contact with the nearest friction plate 62 of the first frictional coupling device 36 to force the friction plates 62, 64 against each other. A first oil chamber 49 which is a pressure-tight space is defined by the first piston 46, the first inner cylindrical wall 44, the first bottom wall 44b and the first annular protrusion 44d.

The second drum 52 is rotatably supported by the stationary member in the form of the housing 16, and consists of two members in the form of an inner drum 70 and an outer drum 72 which are welded together.

The inner drum 70 consists of a second inner cylindrical wall 70a rotatably supported by the housing 16, and a second annular protrusion 70b which extends from one of opposite axial end portions of the second inner cylindrical wall 70a that is remote from the first planetary gear set 24. The second annular protrusion 70b has a cylindrical portion 67, and an abutting portion 66 formed at one of opposite axial ends of the cylindrical portion 67, for abutting contact with the first bottom wall 44b of the first drum 44.

The outer drum 72 is a cylindrical member which is open at one of its opposite axial ends and which consists of a second bottom wall 72a, and a second outer cylindrical wall 72b. The second bottom wall 72a is welded to one of opposite axial end portions of the cylindrical portion 67 of the second annular protrusion 70b of the inner drum 70, which one axial end portion is remote from the abutting portion 66. The second bottom wall 72a extends radially outwardly of the cylindrical portion 67 of the second annular protrusion 70b. The second outer cylindrical wall 72b extends from the radially outer end of the second bottom wall 72a in the axial direction of the automatic transmission 10. The second drum 52 is considered to include the second inner and outer cylindrical portions 70a, 72b, the second bottom wall 72a connecting the second inner and outer cylindrical portions 70a, 72a, and the second annular protrusion 70b which extends from a radially intermediate part of the second bottom wall 72a in the axial direction toward the first drum 44.

The axial open end portion of the second outer cylindrical wall 72b has a splined inner circumferential surface to which the friction plates 62 of the second frictional coupling device 38 are splined at their radially outer ends such that each of the other, friction plates 64 is sandwiched between the adjacent two friction plates 62. The friction plates 64 of the second frictional coupling device 38 are splined at their radially inner ends to a splined outer circumferential surface of the ring gear R1 of the first planetary gear set 24.

The second outer cylindrical wall 72b has a splined outer circumferential surface to which the friction plates 62 of the third frictional coupling device 40 are splined at their radially inner ends such that each of the other friction plates 62 is sandwiched between the adjacent two friction plates 64. The friction plates 62 of the third frictional coupling device 40 are splined at their radially outer ends to a splined inner circumferential surface of a third outer cylindrical wall 16a of the housing 16.

The second piston 54 is axially slidably received in a second annular recess 71 formed between the second annular protrusion 70b and the second outer cylindrical wall 72b.

The second piston 54 consists of a base portion 54a, a sleeve portion 54b, and a presser portion 54c. The base portion 54a is axially slidably fitted through O-rings in the second annular recess 71 between the second annular protrusion 70b and the second outer cylindrical wall 72b. The sleeve portion 54b extends from the radially outer end of the base portion 54a in the axial direction of the automatic transmission 10, through an annular space formed between the first outer cylindrical wall 44c of the first drum 44 and the second outer cylindrical wall 72b of the outer drum 72 of the second drum 52, beyond the axial open end of the first outer cylindrical wall 44c, toward the friction plates 62, 64 of the second frictional coupling device 38. The presser portion 54c is formed at the axial end of the sleeve portion 54b remote from the base portion 54a, for pressing contact with the nearest friction plate 72 of the second frictional coupling device 38, to force the friction plates 62, 64 against each other. A second oil chamber 55 which is a pressure-tight space is defined by the base portion 54a of the second piston 54, the second bottom wall 72a and second outer cylindrical wall 72b of the outer drum 72, and the second annular protrusion 70b.

The third piston 61 is axially slidably received through O-rings in a space formed between the third outer cylindrical wall 16a and a third annular protrusion 16b of the housing 16. The third piston 61 includes a presser portion 61a for pressing contact with the nearest friction plate 72 of the third frictional coupling device 40, to force the friction plates 62, 64 against each other. The presser portion 61a extends through a spring seat 68 fixed to the third outer cylindrical wall 16a, and a return spring 65 is interposed between the spring seat 68 and the third piston 61, to bias the third piston 61 toward its original axial position in an axial direction away from friction plates 62, 64 of the third frictional coupling device 40. A third oil chamber 63 which is a pressure-tight space is defined by the third piston 61, the third outer cylindrical wall 16a and the third annular protrusion 16b.

The spring seat 50 is a disk-shaped member is fitted between the outer circumferential surface of the second inner cylindrical wall 70a of the inner drum 70 and the inner circumferential surface of the first outer sleeve portion 46c of the first piston 46. The above-described return spring 48 for biasing the first piston 48 in the axial direction away from the friction plates 62, 64 of the first frictional coupling device 36 is interposed between the spring seat 50 and the first piston 46. The spring seat 50 is held, at its surface on the side of the second frictional coupling device 38, in abutting contact with a retainer ring 78 fixed to the outer circumferential surface of the second inner cylindrical wall 70a of the inner drum 70. The retainer ring 78 prevents an axial movement of the spring seat 50 in the axial direction away from the first piston 46. A pressure-tight space defined by the spring seat 50, the first piston 46, the first inner cylindrical wall 44a and the second cylindrical wall 70a functions as a so-called "centrifugal-pressure canceling chamber".

The spring seat 58 is a disk-shaped member is fitted between the outer circumferential surface of the second annular protrusion 70b of the inner drum 70 and the inner circumferential surface of the sleeve portion 54b of the second piston 54. The above-described return spring 56 for biasing the second piston 54 in the axial direction away from the friction plates 62, 64 of the second frictional coupling device 38 is interposed between the spring seat 58 and the base portion 54a of the second piston 54. The spring seat 58 is held, at its surface on the side of the first drum 44, in abutting contact with a retainer ring 79 fixed to the outer circumferential surface of the second annular protrusion 70b of the inner drum 70. The retainer ring 79 prevents an axial movement of the spring seat 58 in the axial direction away from the second piston 64. A pressure-tight space defined by the spring seat 58, the second piston 64, the second annular protrusion 70b of the inner drum 70 functions as another "centrifugal-pressure canceling chamber".

The housing 16 has a first fluid supply portion 82 for feeding a pressurized working fluid into the first oil chamber 49 through a first through-hole 84 formed through the first inner cylindrical wall 44a of the first drum 44, and a third through-hole 86 formed through the second inner cylindrical wall 70a of the inner drum 70 of the second drum 52. The housing 16 is provided with two first sealing members in the form of rings 87 located on the opposite sides of the first fluid supply portion 82 as seen in the axial direction of the automatic transmission 10. These first sealing rings 87 prevent leakage of the working fluid from the first fluid supply portion 82.

The housing 16 further has a second fluid supply portion 92 for feeding the pressurized working fluid into the second oil chamber 55 through a second through-hole 94 formed through the cylindrical portion 67 of the second annular protrusion 70b of the inner drum 70 of the second drum 52. The housing 16 is provided with two second sealing members in the form of rings 95 located on the opposite sides of the second fluid supply portion 92 as seen in the axial direction of the automatic transmission 10. These second sealing rings 95 prevent leakage of the working fluid from the second fluid supply portion 92.

The cylindrical portion 67 of the second annular protrusion 70b of the inner drum 70, through which the second through-hole 94 is formed in fluid communication with the second fluid supply portion 92, has a larger diameter than the second inner cylindrical portion 70a of the inner drum 70. Accordingly, the second fluid supply portion 92 is located radially outwardly of the first fluid supply portion 82. Accordingly, one of the two first sealing rings 87 located on one side of the first fluid supply portion 82 which is nearer to the second fluid supply portion 92, and one of the two second sealing rings 95 located on one side of the second fluid supply portion 92 which is nearer to the first fluid supply portion 82 can be located relatively close to each other in the axial direction of the automatic transmission 10, without an interference between those two adjacent sealing rings 87, 95. Therefore, the first and second fluid supply portions 82, 92 can be located close to each other even where the above-indicated two adjacent sealing rings 87, 95 are located at substantially the same axial position of the automatic transmission 10.

In the present embodiment, the first drum 44 and the second drum 52 are connected to each other such that the first and second drums 44, 52 are axially movable relative to each other but are not rotatable relative to each other, that is, rotated together. To this end, the axial open end portion of the first inner cylindrical wall 44a of the first drum 44 has a splined inner circumferential surface, while the corresponding axial open end portion of the second inner cylindrical wall 70a of the inner drum 70 of the second drum 52 has a splined outer circumferential surface. Thus, the first inner cylindrical wall 44a and the second inner cylindrical wall 70a cooperate to have a spline-fitting portion 70 for permitting the axial relative movement of the first and second drums 44, 52 while inhibiting the relative rotation of these two drums 44, 52. It is further noted that the abutting portion 66 of the second annular protrusion 70b of the inner drum 70 functions as a stopper for limiting the distance of relative axial movement of the first and second drums 44, 52, by the abutting contact of the abutting portion 66 with the first bottom wall 44. Further, the return spring 48 which is seated on the spring seat 50 and which biases the first piston 46 and first drum 44 toward the second drum 52 functions to limit the distance of the axial movements of the first and second drums 44, 52 toward the spring seat 50.

A lubricant receiver plate 98 is interposed between the spring seat 50 and the carrier CA1 of the first planetary gear set 24. This lubricant receiver plate 98 also functions as a stopper for limiting the axial movement of the first and second drums 44, 52 as a unit. The lubricant receiver plate 98 serves to collect a lubricant and direct the collected lubricant into an oil passage 100 formed through the carrier CA1 of the first planetary gear set 24, for lubricating the planetary gears P of the first planetary gear set 24.

There will be described an operation of the automatic transmission 10 constructed according to the present invention.

When the pressurized working fluid is fed into the first oil chamber 49 through the first fluid supply portion 82 of the housing 16, the first through-hole 84 of the first inner cylindrical wall 44a and the third through-hole 86 of the second inner cylindrical wall 70a, the first piston 46 is axially moved such that the base portion 46b is moved in the axial direction away from the first bottom wall 44b of the first drum 44, so that the presser portion 46d is brought into abutting contact with the nearest friction plate 62 of the first frictional coupling device 36. Since the axial movement of the friction plates 62, 64 of the first frictional coupling device 36 toward the axial open end of the first drum 44 is prevented by the retainer ring 78 which is located on one side of the first frictional coupling device 36 which is remove from the presser portion 46d and which is fixed to the inner circumferential surface of the first outer cylindrical wall 44c of the first drum 44. Accordingly, the friction plates 62, 64 of the first frictional coupling device 36 are forced against each other by the axial movement of the presser portion 46d toward the retainer ring 78. Thus, the first frictional coupling device 36 in the form of the first clutch C1 is brought into its engaged state.

When the first frictional coupling device 36 is engaged by the axial movement of the first piston 46, as described above, a rotary motion of the carrier CA1 of the first planetary gear set 24 is transmitted to the first drum 44, so that the second drum 52 is rotated together with the first drum 44. It is noted that the first drum 44 and the second drum 52 cooperate to function as the first rotary member 13 of the first planetary gear set 24 including the first frictional coupling device 36 in the form of the first clutch C1 shown in FIG. 1. The rotary motion of the first rotary member 13 is transmitted to the sun gear S2 of the second planetary gear set 26.

When the pressurized working fluid is fed into the second oil chamber 55 through the second fluid supply portion 92 of the housing 16 and the second through-hole 94 of the second annular protrusion 70b of the inner drum 70, the second piston 54 is axially moved such that the base portion 54a is moved in the axial direction away from the second bottom wall 72a of the outer drum 72, so that the presser portion 54c is brought into abutting contact with the nearest friction plate 62 of the second frictional coupling device 38. Since the axial movement of the friction plates 62, 64 of the second frictional coupling device 38 toward the axial open end of the outer drum 72 is prevented by the retainer ring 96 which is located on one side of the second frictional coupling device 38 which is remove from the presser portion 54c and which is fixed to the inner circumferential surface of the second outer cylindrical wall 72b of the outer drum 72. Accordingly, the friction plates 62, 64 of the second frictional coupling device 38 are forced against each other by the axial movement of the presser portion 54c toward the retainer ring 96. Thus, the second frictional coupling device 38 in the form of the second clutch C2 is brought into its engaged state.

When the second frictional coupling device 38 is engaged by the axial movement of the second piston 54, as described above, a rotary motion of the ring gear R1 of the first planetary gear set 24 is transmitted to the second drum 52. It is noted that the ring gear R1 functions as the third rotary member 15 of the first planetary gear set 24 including the second frictional coupling device 38 in the form of the second clutch C2 shown in FIG. 1. The rotary motion of the third rotary member 15 is transmitted to the sun gear S2 of the second planetary gear set 26.

When the pressurized working fluid is fed into the third oil chamber 63 through a fluid passage not shown, the third piston 61 is axially moved toward the third frictional coupling device 40, so that the presser portion 61a is brought into abutting contact with the nearest friction plate 62 of the third frictional coupling device 40. Since the axial movement of the friction plates 62, 64 of the third frictional coupling device 40 toward the axial open end of the third outer cylindrical wall 16a of the housing 16 is prevented by a retainer ring 104 which is located on one side of the third frictional coupling device 40 which is remove from the presser portion 61a and which is fixed to the inner circumferential surface of the third outer cylindrical wall 16b. Accordingly, the friction plates 62, 64 of the third frictional coupling device 40 are forced against each other by the axial movement of the presser portion 61a toward the retainer ring 104. Thus, the third frictional coupling device 40 in the form of the first brake B1 is brought into its engaged state.

When the third frictional coupling device 40 is engaged by the axial movement of the third piston 61, as described above, rotary motions of the second drum 52 and the first drum 44 are stopped and inhibited. It is noted that the first and second drums 44, 52 function as the first rotary member 13 of the first planetary gear set 24 including the third frictional coupling device 40 in the form of the second clutch C2 shown in FIG. 1. The rotary motion of the sun gear S2 of the second planetary gear set 26 is stopped and inhibited.

In the automatic transmission 10 constructed according to the illustrated embodiment of this invention, the first fluid supply portion 82 and the second fluid supply portion 92 are located at the respective different radial positions of the automatic transmission 10, so that the first sealing rings 87 provided for the first fluid supply portion 82 and the second sealing rings 95 provided for the second fluid supply portion 92 do not interfere with each other. Accordingly, the first and second fluid supply portions 82, 92 can be located close to each other in the axial direction of the automatic transmission 10, whereby the required axial dimension of the automatic transmission 10 can be reduced.

The illustrated embodiment is further arranged such that the pressurized working fluid is fed into the second oil chamber 55 through the second fluid supply portion 92 and the second through-hole 94 formed through the cylindrical portion 67 of the second annular protrusion 70b of the inner drum 70 of the second drum 52, so that the second piston 54 is advanced by the pressure of the working fluid introduced into the second oil chamber 55.

The illustrated embodiment is also arranged such that the pressurized working fluid is fed into the first oil chamber 49 through the first fluid supply portion 82, the first through-holes 84 formed through the first inner cylindrical wall 44a of the first drum 44, and the third through-hole 86 formed through the second inner cylindrical wall 70a of the second drum 52, so that the first piston 46 is advanced by the pressure of the working fluid introduced into the first oil chamber 49.

The illustrated embodiment is further arranged such that the first inner cylindrical wall 44a of the first drum 44 and the second inner cylindrical wall 70a of the second drum 52 are splined to each other so as to inhibit relative rotation of those first and second inner cylindrical walls 44a, 70a, so that the first and third through-holes can be formed through the respective first and second inner cylindrical walls 44a, 70a.

The illustrated embodiment is still further arranged such that the first clutch C1 is provided to selectively connect the mutually coaxial first and second rotary members 13, 14 to each other, while the second clutch C2 is provided to selectively connect the mutually coaxial first and third rotary members 13, 15 to each other, so that the first rotary member 13 can be rotated at different speeds when the first clutch C1 and the second clutch C2 are selectively engaged, respectively, permitting the automatic transmission 10 to have a relatively large number of operating positions having respective different speed ratios.

While the preferred embodiment of the present invention has been described in detail by reference to the accompanying drawing, it is to be understood that the invention is not limited to the details of the illustrated embodiment, but may be otherwise embodied.

The automatic transmission 10 according to the illustrated embodiment is suitably used for a vehicle equipped with a transversely-mounted engine, such as an FF (front-engine front-drive) vehicle, in which the automatic transmission is installed such that the axis of the automatic transmission is parallel to the lateral or transverse direction of the vehicle. However, the automatic transmission according to the present invention may be used for a vehicle equipped with a longitudinally-mounted engine, such as an FR vehicle, in which the automatic transmission is installed such that the axis of the automatic transmission is parallel to the longitudinal direction of the vehicle.

It is to be understood that the present invention may be embodied with various other changes and modifications which may occur to those skilled in the art.

The invention claimed is:

1. An automatic transmission including a first clutch and a second clutch, comprising:
   a first drum in which a first piston of said first clutch is axially slidably received and which cooperates with said first piston to define a first oil chamber therebetween;
   a second drum which is disposed coaxially with said first drum, so as to accommodate said first drum, and in which a second piston of said second clutch is axially slidably received, said second drum cooperating with said second piston to define a second oil chamber therebetween;
   a first fluid supply portion for feeding a working fluid into said first oil chamber through said first drum and said second drum, to operate said first piston; and
   a second fluid supply portion for feeding the working fluid into said second oil chamber through said second drum, to operate said second piston,
   wherein said second fluid supply portion is located radially outwardly of said first fluid supply portion,
   said second drum includes a second inner cylindrical wall and a second outer cylindrical wall which are coaxial with each other, and further includes a second bottom wall connecting corresponding axial end portions of said second inner and outer cylindrical walls,
   said second drum further including a second annular protrusion extending from a radially intermediate part of said second bottom wall in an axial direction thereof toward said first drum,
   said second inner cylindrical wall and said second annular protrusion of said second drum being rotatably supported by a housing of said automatic transmission,
   said second piston being axially slidably received in a second annular recess formed between said second annular protrusion and said second outer cylindrical wall,
   said second oil chamber being defined by said second piston, said second outer cylindrical wall, said second bottom wall and said second annular protrusion,
   said second fluid supply portion communicating with said second oil chamber through a second through-hole formed through said second annular protrusion, and
   said first fluid supply portion communicating with said first oil chamber through a third through-hole formed through said second inner cylindrical wall and a first through-hole formed through a first inner cylindrical wall.

2. The automatic transmission according to claim 1, wherein said first drum includes the first inner cylindrical wall and a first outer cylindrical wall which are coaxial with each other, and further includes a first bottom wall connecting corresponding axial end portions of said first inner and outer cylindrical walls,
   said first drum further including a first annular protrusion extending from a radially intermediate part of said first bottom wall in an axial direction thereof away from said second drum,
   said first piston being axially slidably received in a first annular recess formed between said first annular protrusion and said first inner cylindrical wall,
   said first oil chamber being defined by said first piston, said first inner cylindrical wall, said first bottom wall and said first annular protrusion,
   said first fluid supply portion communicating with said first oil chamber through said first through-hole formed through said first inner cylindrical wall, and said third through-hole formed through said second inner cylindrical wall.

3. The automatic transmission according to claim 2, wherein said first inner cylindrical wall of said first drum and said second inner cylindrical wall of said second drum are fixed to each other so as to inhibit relative rotation of said first and second inner cylindrical walls.

4. The automatic transmission according to claim 3, wherein said first clutch is provided to selectively connect a first rotary member to a second rotary member disposed coaxially with said first rotary member, and said second clutch is provided to selectively connect said first rotary member to a third rotary member disposed coaxially with said first rotary member.

5. The automatic transmission according to claim 2, further comprising a housing which has said first fluid supply portion formed in communication with said first and third through-holes, and said second fluid supply portion formed in communication with said second through-hole.

6. The automatic transmission according to claim 5, wherein said housing includes two first sealing members disposed on opposite sides of said first fluid supply portion as seen in an axial direction of the automatic transmission, and two second sealing members disposed on opposite sides of said second fluid supply portion as seen in the axial direction of the automatic transmission.

7. The automatic transmission according to claim 2, wherein the first piston includes a first presser portion extending radially outwardly from the first piston, such that the first presser portion presses the first clutch, and the first presser portion is axially slidably received in a third annular recess formed between the first annular protrusion and the first outer cylindrical wall.

8. The automatic transmission according to claim 1, further comprising an abutting portion for abutting contact of said first and second drums with each other in an axial direction of the first and second drums, and a fitting portion at which said first drum is fitted in said second drum and which inhibits relative rotation of said first and second drums about a common axis of the first and second drums.

9. The automatic transmission according to claim 8, wherein said first drum includes a first inner cylindrical wall and a first outer cylindrical wall that are coaxial with each other, and a first bottom wall connecting corresponding axial end portions of said first and second cylindrical walls, and said fitting portion being a spline-fitting portion constituted by first spline teeth formed on an inner circumferential surface of said first inner cylindrical wall, and second spline teeth formed on an outer circumferential surface of said second cylindrical wall.

10. The automatic transmission according to claim 9, wherein said second drum further includes a second annular protrusion extending from a radially intermediate part of said second bottom wall in an axial direction thereof toward said first bottom wall, for abutting contact with said first bottom wall, and said abutting portion includes said second annular protrusion.

11. The automatic transmission according to claim 1, wherein the first piston includes a first presser portion extending radially outwardly from the first piston, such that the first presser portion presses the first clutch.

12. The automatic transmission according to claim 1, wherein the second piston includes a second presser portion extending axially away from the second bottom wall, such that the second presser portion presses the second clutch.

13. The automatic transmission according to claim 1, further comprising:

means for inhibiting relative rotation of the first drum and the second drum about a common axis of the first drum and the second drum.

14. The automatic transmission according to claim 13, wherein the second drum includes an abutting portion that abuts the first drum.

* * * * *